United States Patent
Suzuki et al.

(10) Patent No.: US 7,530,346 B2
(45) Date of Patent: May 12, 2009

(54) INTAKE STRUCTURE OF V-TYPE INTERNAL COMBUSTION ENGINE

(75) Inventors: Shosuke Suzuki, Saitama (JP); Tomoyuki Tokisato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 11/882,916

(22) Filed: Aug. 7, 2007

(65) Prior Publication Data

US 2008/0035090 A1 Feb. 14, 2008

(30) Foreign Application Priority Data

Aug. 9, 2006 (JP) .............................. 2006-216542

(51) Int. Cl.
*F02M 35/116* (2006.01)
*F02M 35/10* (2006.01)

(52) U.S. Cl. .................................. 123/399; 123/184.31

(58) Field of Classification Search .................. 123/399, 123/184.31, 184.34, 184.35, 184.37, 184.21
See application file for complete search history.

(56) References Cited

U.S. PATENT DOCUMENTS 5,133,307 A * 7/1992 Kurihara ................ 123/184.31
6,296,536 B1 * 10/2001 Katayama et al. ............. 440/77
6,305,354 B1 * 10/2001 Kato ........................... 123/456
2006/0213475 A1 * 9/2006 Sekimoto ................ 123/184.35
2007/0272190 A1 * 11/2007 Sasaki .................... 123/184.34

FOREIGN PATENT DOCUMENTS

JP 3106724 B2 9/2000

* cited by examiner

*Primary Examiner*—Mahmoud Gimie
(74) *Attorney, Agent, or Firm*—Birch, Stewart, Kolasch & Birch, LLP (57) ABSTRACT

In an internal combustion engine wherein an intake manifold for performing intake for the front and rear cylinders is placed in a narrow and high-temperature V-bank, to provide a structure of an intake device that does not allow an overall height of the internal combustion engine to become high. An intake structure of a V-type internal combustion engine includes a throttle body having a throttle opening sensor on one end of a throttle valve shaft that is provided so that an intake passage of the throttle body can extend in a crankshaft direction between front and rear cylinders. The center of the intake passage of the throttle body is disposed to be shifted to one cylinder side, and the throttle opening sensor is placed on a side where the center of the intake passage of the throttle body is apart from the cylinder.

20 Claims, 8 Drawing Sheets

INTAKE STRUCTURE OF V-TYPE INTERNAL COMBUSTION ENGINE

CROSS-REFERENCE TO RELATED APPLICATIONS

The present application claims priority under 35 USC 119 to Japanese Patent Application No. 2006-216542 filed on Aug. 9, 2006 the entire contents of which are hereby incorporated by reference.

BACKGROUND OF THE INVENTION

1. Field of the Invention

The present invention relates to a structure of an intake device of a V-type internal combustion engine.

2. Description of Background Art

Heretofore, in a V-type internal combustion engine, an intake device that performs intakes of front and rear cylinders has been disposed in a V-bank between the cylinders. However, the space in the V-bank is narrow, and the temperature in the space is high. Accordingly, the space for placing the intake device is limited. Heretofore, the intake device has been disposed above the V-bank, and accordingly, the overall height of the internal combustion engine has become high. See, for example, Japanese Patent No. 3106724 (FIG. 1).

SUMMARY AND OBJECTS OF THE INVENTION

It is an object of an embodiment the present invention to provide a structure for an intake device that does not allow the overall height of the internal combustion engine to become high.

An embodiment of the present invention has achieved the foregoing object by providing an intake structure of a V-type internal combustion engine in which an intake manifold that performs intakes of front and rear cylinders is placed in a V-bank. The intake structure includes a throttle body including a throttle opening sensor on one end of a throttle valve shaft that is provided so that an intake passage of the throttle body extends in a crankshaft direction between the front and rear cylinders. The center of the intake passage of the throttle body is disposed to be shifted to one cylinder side, and the throttle opening sensor is placed on a side where the center of the intake passage of the throttle body is apart from the cylinder.

According to an embodiment of the invention, the intake structure of a V-type internal combustion engine includes an intake manifold wherein the center of the intake passage is disposed to be shifted to the one cylinder side with respect to the center position between front and rear injection valves. The thickness of a coupling flange portion to the engine on the side where the center of the intake passage is apart from the cylinder is made thicker than on other sides.

According to an embodiment of the present invention, the intake structure of a V-type internal combustion engine is an SOHC type internal combustion engine with a V-bank angle of 90 degrees or less.

According to an embodiment of the present invention, the throttle opening sensor is placed on the side where the center of the intake passage is apart from the cylinder, and is isolated from the cylinder, thereby being able to be protected from heat from the engine.

According to an embodiment of the present invention, the center of the intake passage is disposed to be shifted to the one cylinder side. Accordingly, the thickness of the coupling flange portion can be made thick on the side where a gap with the cylinder is increased, and it becomes easy to manufacture the intake manifold. Thus, productivity is enhanced.

According to an embodiment of the present invention, the intake device is placed in a narrow space of the V-bank, thus making it possible to lower the overall height of the internal combustion engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
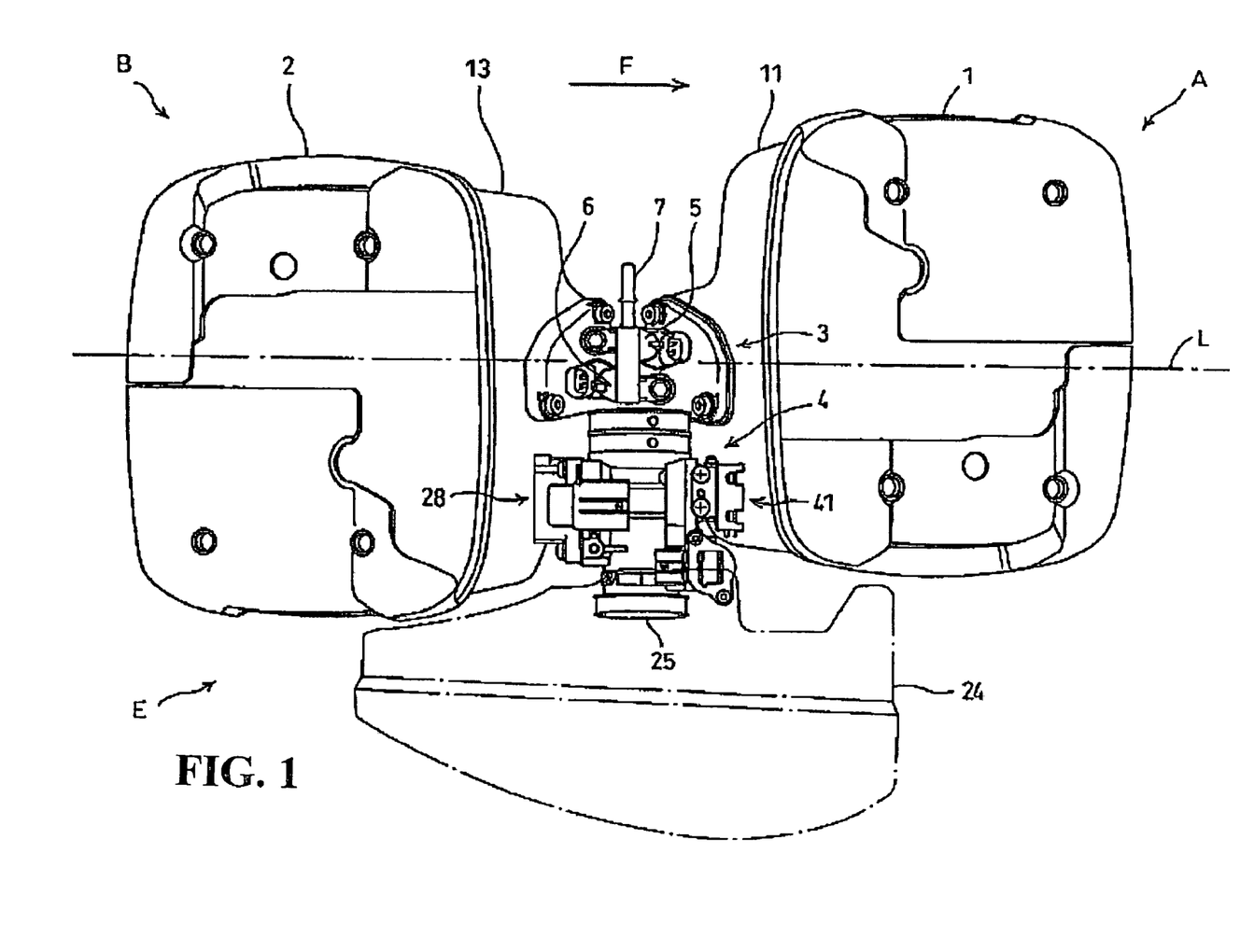
FIG. 1 is a top view showing a state where an intake structure according to the present invention is attached onto cylinders of a V-type internal combustion engine.

FIG. 1 is a top view showing a state where an intake structure according to an embodiment of the present invention is attached onto cylinders of a V-type internal combustion engine E. The internal combustion engine includes a centerline L that extends in a fore and aft direction. Arrow F is parallel to the centerline in the fore and aft direction, and indicates a forward direction in the traveling direction of a vehicle. The internal combustion engine is an SOHC type internal combustion engine with a V-bank angle of 52 degrees that is mounted on a motorcycle. As illustrated in FIG. 1, a front cylinder A is provided together with a rear cylinder B. A front head cover 1 is provided together with a rear head cover 2. A front cylinder head 11 is positioned adjacent to a rear cylinder head 13.

In FIG. 1, an intake manifold 3 and a throttle body 4 are attached between both of the cylinder heads 11 and 13. Branch passages of the intake manifold 3 are attached to intake ports of the cylinder heads 11 and 13, and the throttle body 4 is attached to the intake manifold 3. The throttle body 4 extends from one side of the intake manifold 3 to a right side in the traveling direction of the vehicle. An air cleaner 24 is disposed on a right side of the cylinders. An air cleaner attachment portion opening 25 on a right end of the throttle body 4 is connected to the air cleaner 24. A front fuel injection valve 5 and a rear fuel injection valve 6 are mounted on an upper surface of the intake manifold 3. At a position equidistant from both of the fuel injection valves, a fuel pipe 7 is provided perpendicularly to the fore and aft direction.

Figure 2:
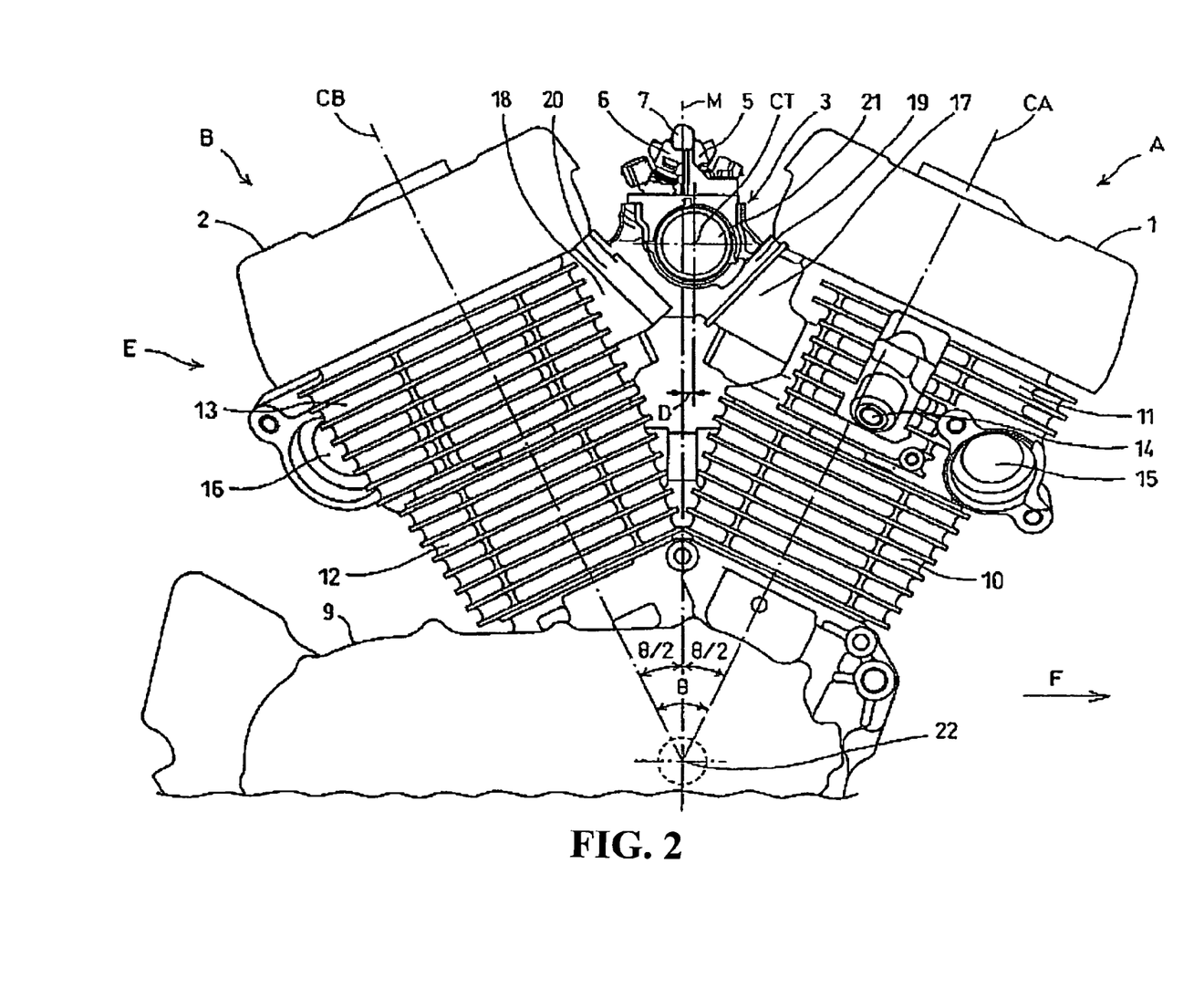
FIG. 2 is a side view of cylinder portions of the V-type internal combustion engine including an intake manifold 3 of the intake structure.

FIG. 2 is a side view of the main portion of the V-type internal combustion engine E including the intake manifold 3 with the above-described intake structure. In FIG. 2, a state is shown, where the throttle body 4 is detached and only the intake manifold 3 is mounted. In this internal combustion engine, on a front side of an upper surface of a crankcase 9, a front cylinder block 10, the front cylinder head 11 and the front head cover 1 are assembled. On a rear side of the upper surface, a rear cylinder block 12, the rear cylinder head 13, and the rear head cover 2 are assembled.

In the front cylinder A of FIG. 2, a front spark-plug attachment hole 14 is provided together with a front exhaust port 15. In the rear cylinder B, a rear spark-plug attachment hole is provided on a left side surface opposite from the side of the front spark-plug attachment hole. Accordingly, the rear spark-plug attachment hole is not shown in the FIG. 1. In addition, a rear exhaust port 16 is mounted thereto. On a side where both of the cylinder heads are facing each other, a front intake port 17 and a rear intake port 18 are provided, onto which end portions of the branch sides of the intake manifold 3 are attached while interposing a front flange 19 and a rear flange 20 therebetween, respectively. A throttle body attachment portion opening 21 is provided. A center CT of an intake passage is also the center of the throttle body attachment portion opening 21.

In FIG. 2, the front cylinder A includes a cylinder centerline CA. The rear cylinder B includes a cylinder centerline CB. An angle θ denotes an angle made by both of the centerlines when viewed from the side, that is, the V-bank angle θ. A plane M contains a bisector of the V-bank angle θ and an axis line of a crankshaft 22, that is, an inter-cylinder center plane. The fuel pipe 7 is provided on the inter-cylinder center plane M, and the front fuel injection valve 5 and the rear fuel injection valve 6 are individually provided at positions equidistant from the inter-cylinder center plane M. The center CT of the throttle body attachment portion opening 21 is provided to be shifted by a deflection D from the inter-cylinder center plane M to the front cylinder side.

Figure 3:
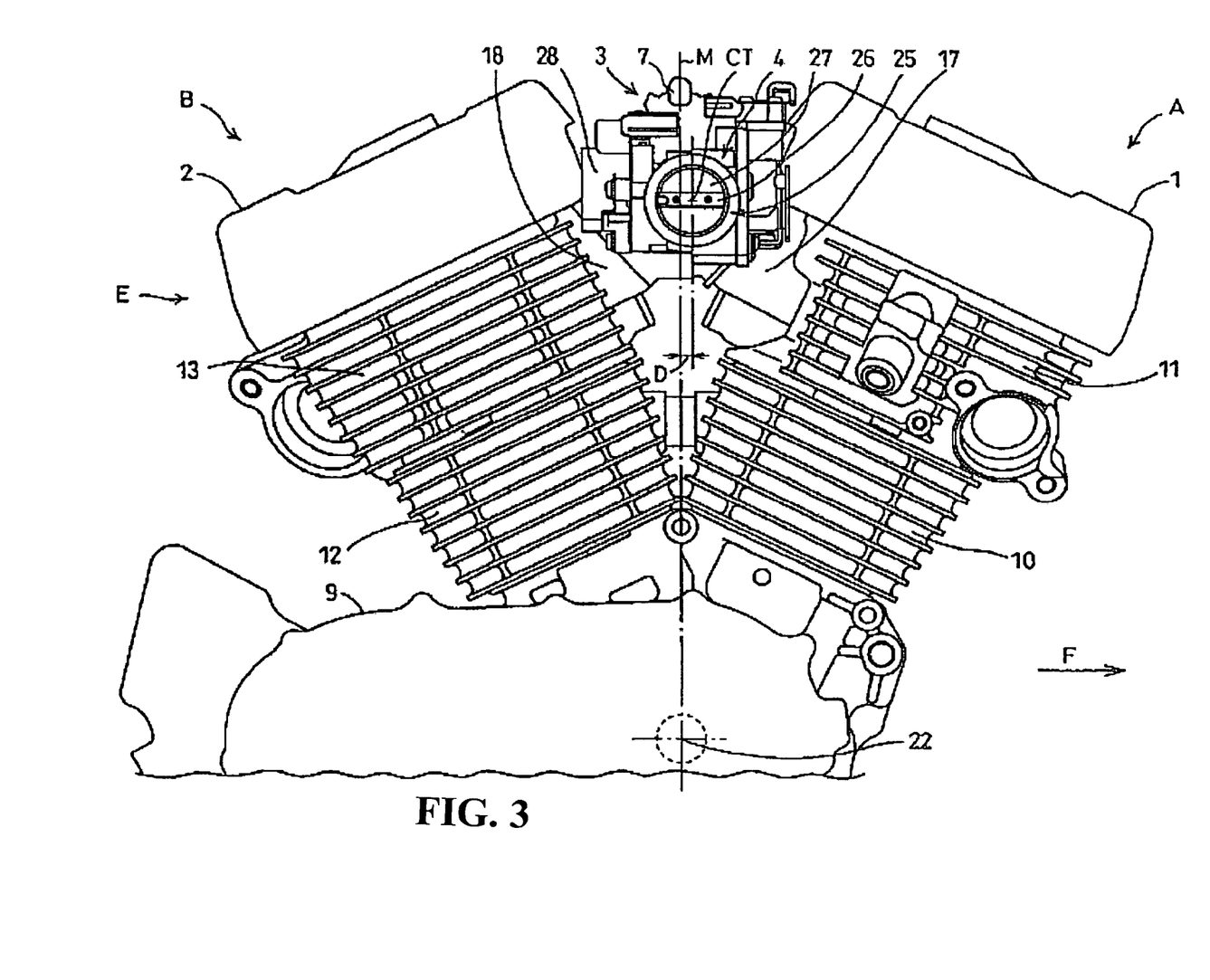
FIG. 3 is a side view of the cylinder portions of the V-type internal combustion engine including the intake structure, showing a state where a throttle body 4 is attached onto the intake manifold 3.

FIG. 3 is a side view of the main portion of the V-type internal combustion engine E including the intake structure, showing a state wherein the throttle body 4 is attached onto the intake manifold 3. The air cleaner attachment portion opening 25 is provided on the end of the throttle body. A centerline of the throttle body, that is, the center CT of the intake passage is deflected forwardly. Accordingly, the center of the air cleaner attachment portion opening is also shifted forward by the deflection D from the inter-cylinder center plane M. The center of the intake manifold 3, that is, a position of the fuel pipe 7 coincides with the inter-cylinder center plane M. Accordingly, the intake passage center CT is shifted by the deflection D also with respect to the center of the intake manifold. In the inside of the air cleaner attachment portion opening 25 of FIG. 3, a throttle valve shaft 26 and a throttle valve plate 27 are illustrated. On the rear cylinder B side of the throttle body 4, a throttle opening sensor 28 is provided, which measures a rotational angle of the throttle valve shaft 26, and which senses an opening of a throttle. The position of the throttle opening sensor 28 is also shown in FIG. 1.

Figure 4:
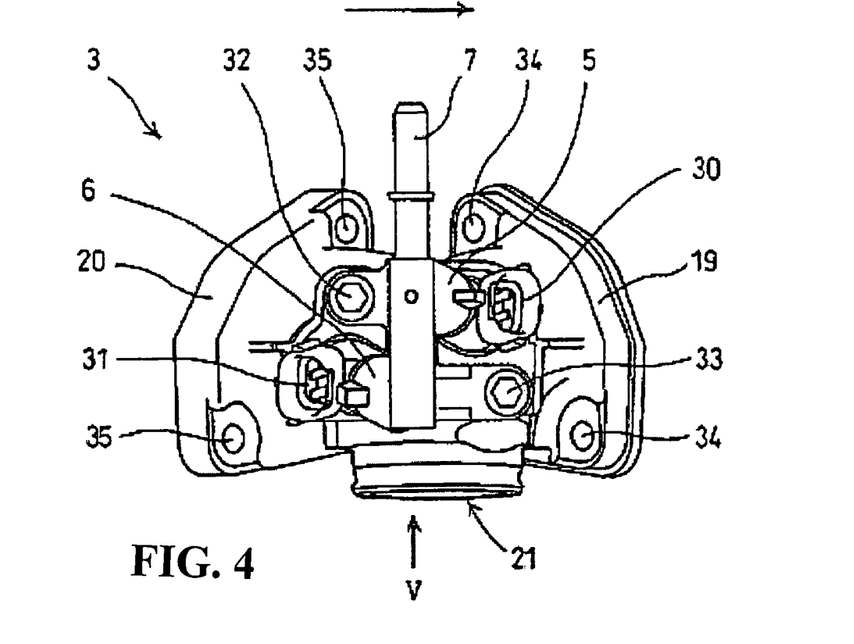
FIG. 4 is a top view of the intake manifold 3.
Figure 5:
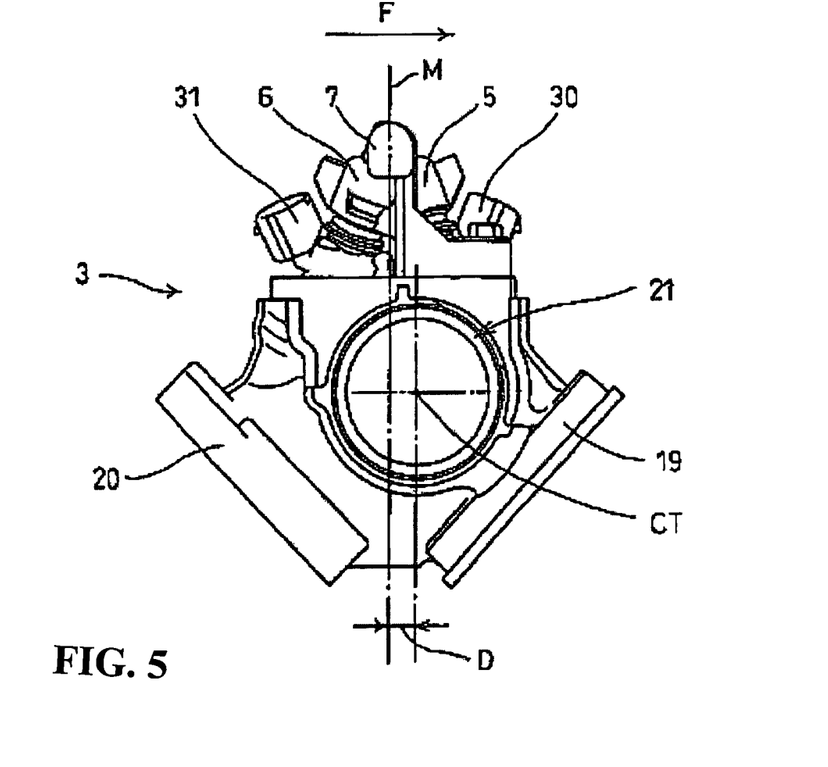
FIG. 5 is a sectional view taken along arrow V of FIG. 4.
Figure 6:
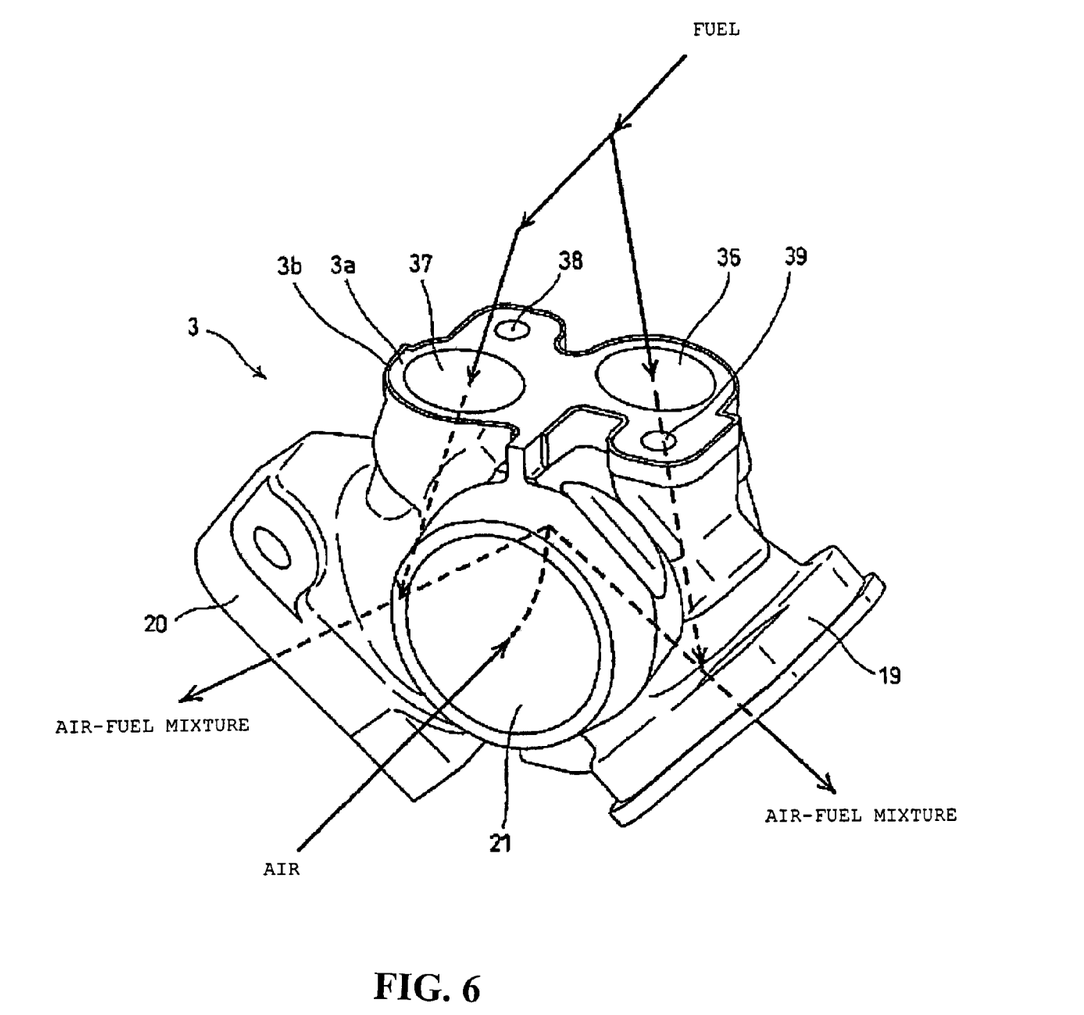
FIG. 6 is a perspective view of the intake manifold 3.

FIG. 4 is a top view of the intake manifold 3, FIG. 5 is a sectional view taken along arrow V of FIG. 4, and FIG. 6 is a perspective view of the intake manifold 3. In FIG. 4, the fuel pipe 7 is located on the center of an upper portion of the intake manifold 3. In the front and rear of the fuel pipe 7, the front fuel injection valve 5 and the rear fuel injection valve 6 are mounted, respectively. Power supply connection portions 30 and 31 are provided on the fuel injection valves 5 and 6, respectively. The fuel injection valves 5 and 6 are fixed to the intake manifold 3 by bolts 32 and 33, respectively.

In FIG. 5, on a lower portion of the intake manifold 3, the front flange 19 and the rear flange 20 for attaching the intake manifold 3 onto the front and rear cylinder heads 11 and 13 are provided. The branch passages of the lower portion of the intake manifold 3 are connected to the intake ports 17 and 18 (FIG. 2) of the respective cylinders, and the flanges 19 and 20 are fixed to the vicinities of the intake ports 17 and 18 of the respective cylinders 11 and 13 while individually interposing bolts inserted into bolt holes 34 and 35 (FIG. 4) therebetween.

In FIG. 6, on the upper portion of the intake manifold 3, an attachment hole 36 is provided for the front fuel injection valve 5 and an attachment hole 37 for the rear fuel injection valve 6. In the vicinities of the respective attachment holes, screw holes 38 and 39 for the fuel injection valve attachment bolts 32 and 33 (FIG. 4) are provided. The front flange 19 and the rear flange 20 are illustrated in the front and rear of the lower portion of the intake manifold 3. The throttle body attachment portion opening 21 is illustrated on a foreground side. In FIG. 6, flows of air, fuel, and an air-fuel mixture are indicated by arrows. A rubber coating layer 3b is formed on an outer surface of a metal portion 3a of the intake manifold 3. The rubber coating layer 3b is formed by placing the metal portion 3a into a metal die, injecting molten rubber into a layered space between the metal portion and the metal die, and curing the rubber. In such a way, coating for the intake manifold 3 is omitted. Since a large gap between the flange portions of the intake manifold and a connection portion of the throttle body is ensured, it is easy to mold the metal die in the case of performing rubber baking for the outer surface.

Figure 7:
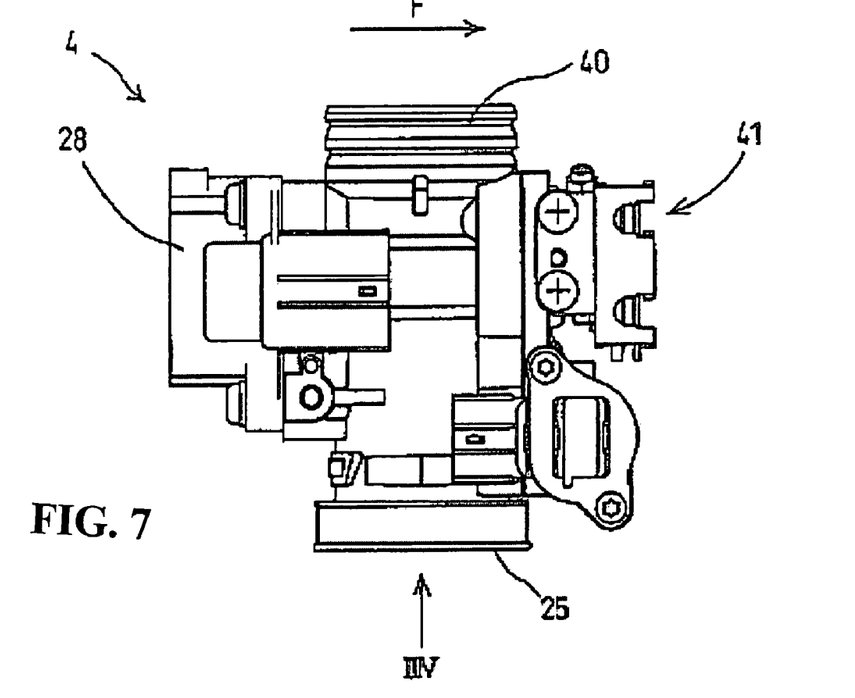
FIG. 7 is a top view of the throttle body 4.
Figure 8:
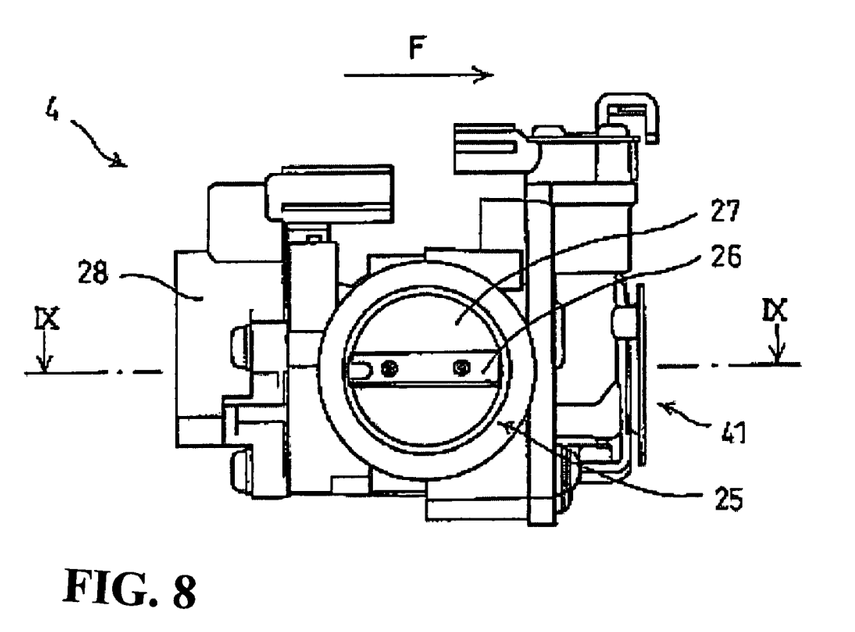
FIG. 8 is a view on arrow IIIV of FIG. 7.
Figure 9:
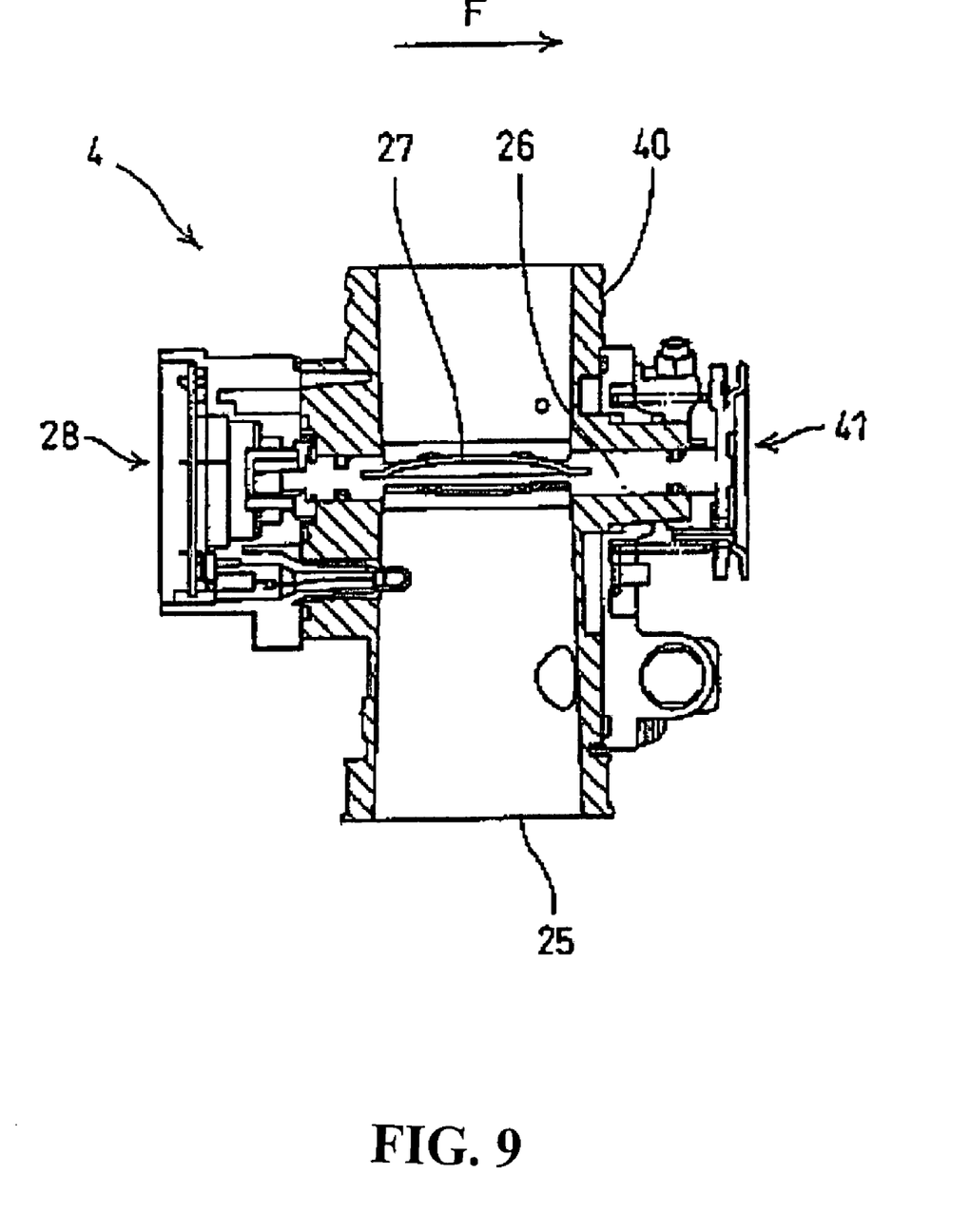
FIG. 9 is a cross-sectional view taken along a line IX-IX of FIG. 8.

FIG. 7 is a top view of the throttle body 4, FIG. 8 is a sectional view taken along arrow IIIV of FIG. 7, and FIG. 9 is a cross-sectional view taken along a line IX-IX of FIG. 8. In FIG. 7, the arrow F indicates forward. An upper portion of FIG. 7 illustrates an attachment portion 40 onto the intake manifold 3. A lower portion of FIG. 7 illustrates the air cleaner attachment portion opening 25. A right side of FIG. 7 illustrates a throttle valve drive unit 41 with a left side of FIG. 7 illustrating the throttle opening sensor 28. The air flows in from the air cleaner attachment portion opening 25 in the lower portion of FIG. 7, and flows upward in the drawing.

FIG. 8 is an elevational view of the side of the air cleaner attachment portion opening 25 side. The arrow F indicates forward. The throttle valve shaft 26 and the throttle valve plate 27 are seen in the inside of the air cleaner attachment portion opening 25. The throttle valve drive unit 41 is provided on the right end of the valve shaft 26, and the throttle opening sensor 28 is provided on the left end of the valve shaft 26.

FIG. 9 shows a horizontal cross section of the throttle body 4. The arrow F indicates forward. The air flows in from a left side of FIG. 9, and flows rightward. The throttle valve drive unit 41 is provided on the front side of the throttle body, and the throttle opening sensor 28 is provided on the rear side of the throttle body.

Figure 10:
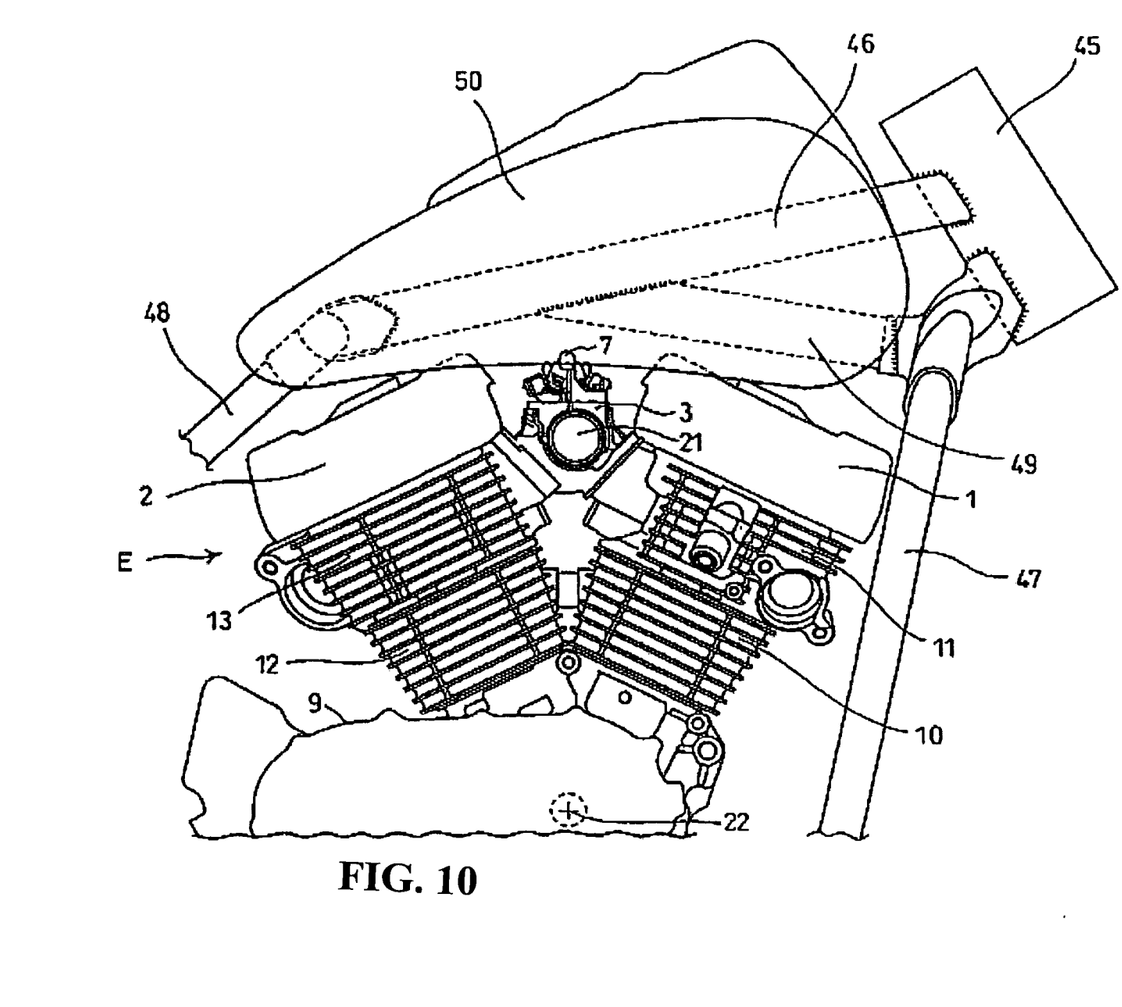
FIG. 10 is a side view of main portion showing a state where the V-type internal combustion engine E of this embodiment, which includes the intake structure, is mounted on a motorcycle.

FIG. 10 is a side view of main portion showing a state where the V-type internal combustion engine E of this embodiment, which includes the above-described intake structure, is mounted on the motorcycle. With regard to a vehicle structure of the motorcycle, a main frame 46 extends rearwardly from a head pipe 45 on the front end thereof, a down frame 47 extends downwardly from the head pipe 45, and a rear frame 48 is connected to a rear portion of the main frame 46 obliquely downwardly therefrom. A base end portion of the down frame 47 and the center portion of the main frame 46 are connected to each other while interposing a reinforcement frame 49 therebetween, and are reinforced. A fuel tank 50 is provided in a form of straddling the main frame 46. The internal combustion engine E is suspended between the down frame 47 and the rear frame 48.

A space between the head covers 1 and 2 of the V-type internal combustion engine E mounted on the vehicle shown in FIG. 10 and lower surfaces of the fuel tank 50, the main frame 46 and the reinforcement frame 49 is narrow. It has been necessary to store such a fuel supply system, the intake manifold and the throttle body in the narrow space surrounded by the narrow V-bank, the lower portion of the fuel tank, and the lower surfaces of the main frame and the reinforcement frame. In the intake structure of this embodiment, the throttle body 4 is connected to the right side of the intake manifold 3, and the air cleaner 24 is further connected to the right side of the throttle body 4. Consequently, these do not extend upwardly. The fuel pipe 7 and the fuel injection valves 5 and 6 are stored in a slight space between the upper portion of the intake manifold 3 and the lower surface of the main frame 46. In such a way, it becomes possible to lower the overall height of the internal combustion engine.

Since the intake structure of the V-type internal combustion engine according to the present invention is constructed as described above, the following effects are brought about.

The throttle opening sensor 28 is disposed on the side where the intake passage center CT of the throttle body is apart from the cylinder, and is isolated from the cylinder. This makes it possible to protect the throttle opening sensor from heat from the engine.

(2) The intake passage center CT is disposed to be shifted to one cylinder side Thus, on the side where the gap with the cylinder is increased, the coupling flange portion can be formed to be thick, it becomes easy to manufacture the intake manifold, and productivity is enhanced. Moreover, the large gap between the flange portion of the intake manifold and the connection portion of the throttle body can be ensured. Consequently, it becomes easy to mold the metal die when performing the rubber baking for the outer circumference.

(3) The intake device is placed in the narrow space of the V-bank, thus making it possible to lower the overall height of the internal combustion engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake structure of a V-type internal combustion engine in which an intake manifold that performs intakes of front and rear cylinders is placed in a V-bank, comprising:
   a throttle body including a throttle opening sensor on one end of a throttle valve shaft is provided so that an intake passage of the throttle body extends in a crankshaft direction in a space between the front and rear cylinders;
   a center of the intake passage of the throttle body is disposed to be shifted to a first cylinder side; and
   the throttle opening sensor is placed on a side where the center of the intake passage of the throttle body is apart from the cylinder.

2. The intake structure of a V-type internal combustion engine according to claim 1, wherein, in the intake manifold, the center of the intake passage is disposed to be shifted to the first cylinder side with respect to a center position between front and rear injection valves; and
   the thickness of a coupling flange portion to the engine on the side where the center of the intake passage is apart from the cylinder is made thicker than on other sides.

3. The intake structure of a V-type internal combustion engine according to claim 2, wherein the internal combustion engine is an SOHC type internal combustion engine with a V-bank angle of 90 degrees or less.

4. The intake structure of a V-type internal combustion engine according to claim 1, wherein the center of the intake passage of the throttle body is shifted by a deflection D from an inter-cylinder center plane to the front cylinder side.

5. The intake structure of a V-type internal combustion engine according to claim 1, wherein the throttle opening sensor measures a rotational angle of a throttle valve shaft for sensing the opening of a throttle.

6. The intake structure of a V-type internal combustion engine according to claim 5, wherein the throttle opening sensor is disposed adjacent to the rear cylinder, and a throttle drive unit is disposed adjacent to the front cylinder.

7. The intake structure of a V-type internal combustion engine according to claim 1, and further including a fuel supply being operatively connected to fuel injection valves, said fuel supply being disposed within the space formed between the front and rear cylinders of the V-type internal combustion engine for lowering the overall height of thereof.

8. An intake structure adapted for use with a V-type internal combustion engine comprising:
   an intake manifold disposed in a space between front and rear cylinders and being operatively connected to the front and rear cylinders;
   a throttle body including a throttle opening sensor being operatively connected on one end of a throttle valve shaft wherein an intake passage of the throttle body extends in a crankshaft direction between the front and rear cylinders; and
   a center of the intake passage of the throttle body is disposed to be shifted to one of the front and rear cylinders;
   wherein the throttle opening sensor is placed on a side of the other of the rear and the front cylinders as compared to the center of the intake passage of the throttle body.

9. The intake structure adapted for use with a V-type internal combustion engine according to claim 8, wherein, in the intake manifold, the center of the intake passage is disposed to be shifted to the first cylinder side with respect to a center position between front and rear injection valves; and
   the thickness of a coupling flange portion to the engine on the side where the center of the intake passage is apart from the cylinder is made thicker than on other sides.

10. The intake structure adapted for use with a V-type internal combustion engine according to claim 9, wherein the internal combustion engine is an SOHC type internal combustion engine with a V-bank angle of 90 degrees or less.

11. The intake structure adapted for use with a V-type internal combustion engine according to claim 8, wherein the center of the intake passage of the throttle body is shifted by a deflection D from an inter-cylinder center plane to the front cylinder side.

12. The intake structure adapted for use with a V-type internal combustion engine according to claim 8, wherein the throttle opening sensor measures a rotational angle of a throttle valve shaft for sensing the opening of a throttle.

13. The intake structure adapted for use with a V-type internal combustion engine according to claim 12, wherein the throttle opening sensor is disposed adjacent to the rear cylinder, and a throttle drive unit is disposed adjacent to the front cylinder.

14. The intake structure adapted for use with a V-type internal combustion engine according to claim 8, and further including a fuel supply being operatively connected to fuel injection valves, said fuel supply being disposed within the space formed between the front and rear cylinder of the V-type internal combustion engine for lowering the overall height of thereof.

15. An intake structure adapted for use with a V-type internal combustion engine comprising:
 a throttle body including a throttle opening sensor being operatively connected on one end of a throttle valve shaft;
 a valve drive unit disposed on a side of the throttle body that is opposite with respect to the throttle opening sensor;
 an intake passage of the throttle body extending in a crankshaft direction between the front and rear cylinders; and
 a center of the intake passage of the throttle body is disposed to be shifted to one of the front and rear cylinders;
 wherein the throttle opening sensor is placed on a side of the other of the rear and the front cylinders as compared to the center of the intake passage of the throttle body.

16. The intake structure adapted for use with a V-type internal combustion engine according to claim 15, and further including an intake manifold, the center of the intake passage is disposed to be shifted to a first cylinder side with respect to a center position between front and rear injection valves; and
 the thickness of a coupling flange portion to the engine on the side where the center of the intake passage is apart from the cylinder is made thicker than on other sides.

17. The intake structure adapted for use with a V-type internal combustion engine according to claim 16, wherein the internal combustion engine is an SOHC type internal combustion engine with a V-bank angle of 90 degrees or less.

18. The intake structure adapted for use with a V-type internal combustion engine according to claim 15, further comprising:
 a front injection valve adapted to inject fuel into the manifold on a front side of the center of the intake passage, and
 a rear injection valve adapted to inject fuel into the manifold on a rear side of the center of the intake passage,
 wherein the center of the intake passage of the throttle body is shifted by a deflection D from an inter-cylinder center plane to the front cylinder side.

19. The intake structure adapted for use with a V-type internal combustion engine according to claim 15, wherein the throttle opening sensor measures a rotational angle of a throttle valve shaft for sensing the opening of a throttle.

20. The intake structure adapted for use with a V-type internal combustion engine according to claim 19, wherein the throttle opening sensor is disposed adjacent to the rear cylinder, and the throttle drive unit is disposed adjacent to the front cylinder.

* * * * *